US011356927B2

(12) United States Patent
Files et al.

(10) Patent No.: US 11,356,927 B2
(45) Date of Patent: Jun. 7, 2022

(54) SYSTEM AND METHOD OF MANAGING DATA CONNECTIONS TO A COMMUNICATION NETWORK USING TIERED DEVICES

(71) Applicant: Dell Products, LP, Round Rock, TX (US)

(72) Inventors: Jace W. Files, Round Rock, TX (US); Liam B. Quinn, Austin, TX (US); Abu S. Sanaullah, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 252 days.

(21) Appl. No.: 16/779,389

(22) Filed: Jan. 31, 2020

(65) Prior Publication Data
US 2021/0243676 A1 Aug. 5, 2021

(51) Int. Cl.
*H04W 48/06* (2009.01)
*H04W 48/16* (2009.01)
*H04W 28/16* (2009.01)
*H04W 28/08* (2009.01)

(52) U.S. Cl.
CPC ......... *H04W 48/06* (2013.01); *H04W 28/085* (2013.01); *H04W 28/16* (2013.01); *H04W 48/16* (2013.01)

(58) Field of Classification Search
CPC ... H04W 28/085; H04W 28/16; H04W 48/06; H04W 48/16
See application file for complete search history.

(56) References Cited

U.S. PATENT DOCUMENTS

| 10,432,798 | B1* | 10/2019 | Wong | H04M 15/61 |
|---|---|---|---|---|
| 2013/0005391 | A1* | 1/2013 | Niass | H04W 48/18 455/525 |
| 2013/0308945 | A1* | 11/2013 | Dhillon | H04Q 11/0003 398/48 |
| 2017/0085493 | A1* | 3/2017 | Senarath | H04W 72/1257 |
| 2018/0054791 | A1* | 2/2018 | Pasulka | H04W 8/24 |

(Continued)

FOREIGN PATENT DOCUMENTS

| KR | 20170052446 A | 5/2017 |
|---|---|---|
| WO | 2017/123277 A1 | 7/2017 |

(Continued)

*Primary Examiner* — Khoa Huynh
(74) *Attorney, Agent, or Firm* — Prol Intellectual Property Law, PLLC; H. Kenneth Prol

(57) ABSTRACT

An information handling system comprising a processor and memory executing an evolved packet core to initiate a tiered communication network access policy by detecting the type of access point connections of an endpoint device to the communication network determining a tier assigned to the endpoint device, and determining communication channel availability, and conducting load balancing based on the tier assignment and to determine a communication channel among a plurality of communication channels to allow access. The evolved packet core to determine which access points within the network to facilitate particular endpoint device tiers of connection and reallocate endpoint device access to such an access point based on a number of endpoint devices coupled to the access point, the tier assigned to each of the endpoint devices, and network slice requirements for each endpoint device.

20 Claims, 8 Drawing Sheets

(56) References Cited

U.S. PATENT DOCUMENTS

| | | | |
|---|---|---|---|
| 2018/0255480 A1* | 9/2018 | Yang | .................... H04W 76/10 |
| 2019/0238407 A1 | 8/2019 | Papa | |
| 2019/0289470 A1 | 9/2019 | Vaidya | |
| 2019/0320494 A1 | 10/2019 | Jayawardene | |
| 2021/0029781 A1* | 1/2021 | Mishra | .................. H04W 88/12 |

FOREIGN PATENT DOCUMENTS

| | | |
|---|---|---|
| WO | 2018/125686 A2 | 7/2018 |
| WO | 2019/104280 A1 | 5/2019 |

\* cited by examiner

SYSTEM AND METHOD OF MANAGING DATA CONNECTIONS TO A COMMUNICATION NETWORK USING TIERED DEVICES

FIELD OF THE DISCLOSURE

The present disclosure generally relates to information handling systems and more specifically relates to information handling systems that facilitate wireless connectivity load balancing.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may conduct one or more forms of wireless network communication.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
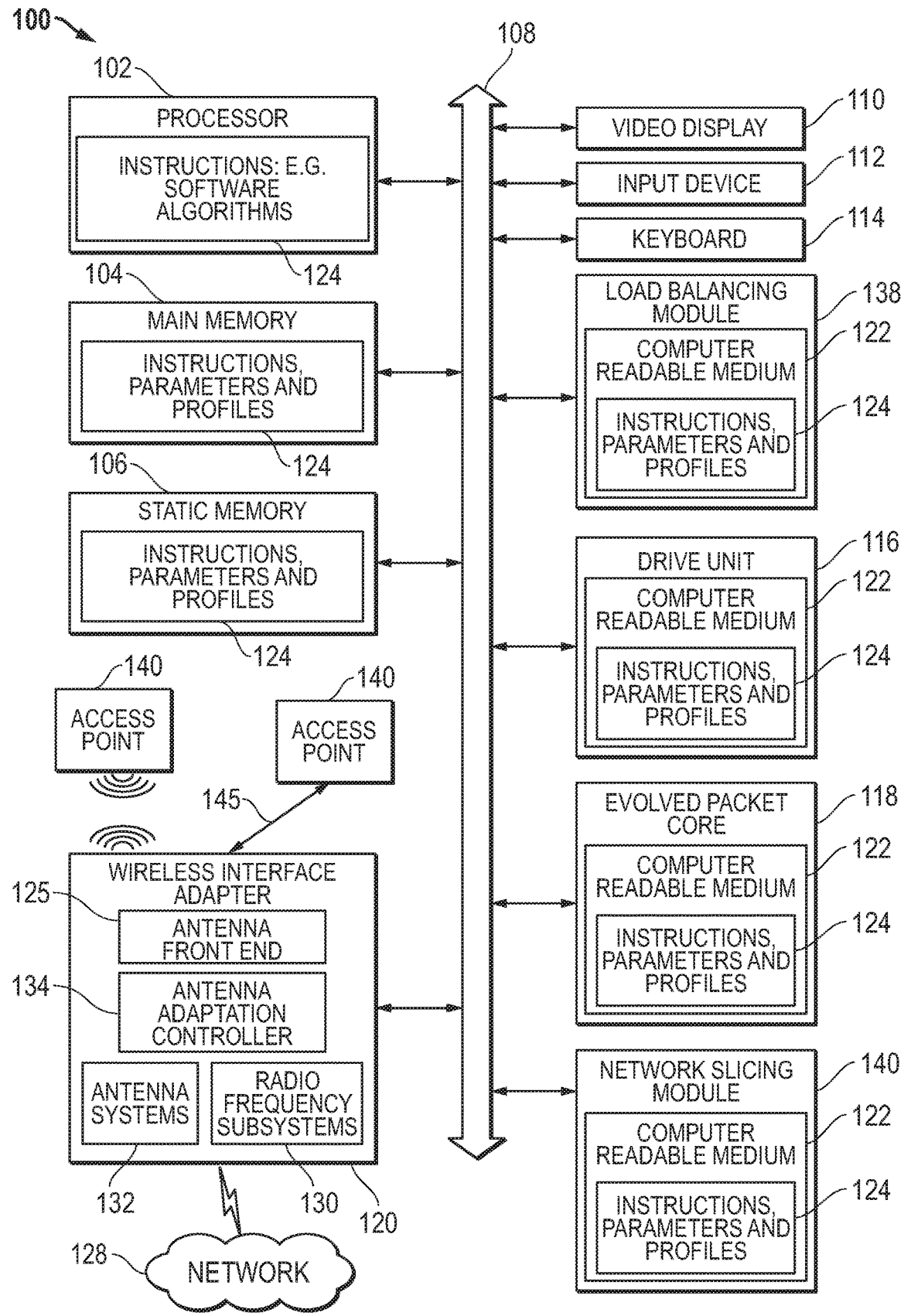
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provides for an information handling system that optimizes data traffic across a network based on a tier assigned to the user and/or user device communicatively coupled to the network, the type of data being uploaded and downloaded across a sliced network connection, and a number and assigned tier of endpoint devices accessing the communication network via an access point. The presently described information handling system may provide for the ability for a private long-term evolution (LTE) communication to be tiered based on, for example, a look-up table descriptive of a tier of an endpoint device. The information handling system may also use the tiered system and protocols to add and remove endpoint devices from a certain communication channel based on the tiers of all endpoint devices communicatively coupled to the communication network. The information handling system may act as a central management plane that reroutes data traffic to an appropriately assigned network topologies based on connection data requirements (e.g., latency, bandwidth, security, among others) and network availability (e.g., 5G millimeter-wave network, private LTE networks, LTE networks, and WiFi networks). The information handling system implement various protocols, algorithms, and processes to load balance endpoint devices across a plurality of access points (APs) used to provide communication to the various endpoints. The tiering status assigned to each endpoint (or user of an endpoint), data descriptive of a physical proximity to any given AP, and data descriptive of a signal strength detected by the endpoint devices and/or endpoint devices may be used to reallocate connections to one of the plurality of APs may be reallocated as this data and the number and type of endpoint devices changes.

In an embodiment, the information handling system may also utilize network slices along with the tiering of endpoint devices to balance the number of endpoint devices and on any virtual network slice formed by the information handling system. The endpoint devices may be moved from network slice to network slice in order to optimize the data throughput and bandwidth used by each network slice.

In an embodiment, the information handling system includes a processor, a memory, and a an evolved packet core to initiate a tiered communication network access policy by detecting the connection of an endpoint device to the communication network via one of a plurality of access points; receiving data descriptive of a tier assigned to the endpoint device; and determining if a communication channel is available on the communication network for the endpoint device to use. In an embodiment, the information handling system may further include a load balancing module to, based on the tier assigned to the endpoint device, determine which communication channel among a plurality of communication channels to allow the endpoint device to access the communication network with; and determine which, among the plurality of access points within the network to facilitate the endpoint device to communicatively coupled to the communication network; and reallocate endpoint device access to the one of the plurality of access points based on a number of endpoint devices communicatively coupled to the communication network via any of the access points of the plurality of access points; the tier assigned to each of the endpoint devices; and network slice requirements for each endpoint device.

FIG. 1 illustrates an information handling system 100 according to several aspects of the present disclosure. The information handling system 100 as illustrated in FIG. 1 may be communicatively coupled to a plurality of access points 140. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of a server the executes an evolved packet core 118. In the present specification and in the appended claims, the evolved packet core 118 may be any device or devices that execute instructions, parameter, and profiles 124 so that voice and data communication requests from endpoints may be received and routed to a communication network as described herein. The execution of the evolved packet core 118 may serve as a gateway for the endpoints to be communicatively coupled, for example, to a private LTE communication network, a public WiFi communication network, a private WiFi communication network, a 4G LTE public communication network, or a 5G millimeter-wave (mm-wave) communication network, among other types of public and private communication networks. The allocation and, in some examples, reallocation of the assignment of any given endpoint to a specific communication network may be dependent on a number of characteristics related to the endpoint device, user of the endpoint device, the type of data being transmitted across the evolved packet core 118, a virtual network slice accessed by the endpoint device, and the access point (AP) accessed through which the endpoint device communicates to the evolved packet core 118, among other characteristics described herein. In an embodiment, the evolved packet core 118 may be a processing core maintained on a communication server that implements the features described herein. In an embodiment, the evolved packet core 118 may be communicatively coupled to a server device that helps to implement the functions and processes described herein. For each of illustration, the evolved packet core 118 may be described herein as a physical processing device that is maintained on the information handling system 100 which may be server on a communication network.

The information handling system 100 may include a memory (volatile (e.g. random-access memory, etc.), non-volatile (read-only memory, flash memory etc.) or any combination thereof), one or more processing resources, such as a central processing unit (CPU), the processor 102 illustrated in FIG. 1, a graphics processing unit (GPU), hardware or software control logic, or any combination thereof. Additional components of the information handling system 100 may include one or more storage devices, one or more communications ports for communicating with external devices, as well as, various input and output (I/O) devices, such as a keyboard 114, a mouse, a video/graphic display 110, or any combination thereof. Further components of the information handling system 100 for use with embodiments herein may include positional sensors 126 such as location sensors, movement sensors, or orientation sensors as described in various embodiments herein. The information handling system 100 may also include one or more buses operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems 100 according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, computer readable medium 122 storing instructions 124 of the evolved packet core 118, a load balancing module 138, a network slicing module 140, and drive unit 116 (volatile (e.g. random-access memory, etc.), nonvolatile (read-only memory, flash memory etc.) or any combination thereof). The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, three-dimensional (3D) mouse, gesture detection system, or touch screen), motion controller, and a keyboard 114. The information handling system 100 may also include a disk drive unit 116.

The network interface device shown as wireless adapter 120 may provide connectivity to one of a plurality of communication networks 128, e.g., a wide area network (WAN), a local area network (LAN), wireless local area network (WLAN), a wireless personal area network (WPAN), a wireless wide area network (WWAN), a private LTE communication network, a public WiFi communication network, a private WiFi communication network, a 4G LTE public communication network, or a 5G millimeter-wave (mm-wave) communication network, or other communication networks. Connectivity 145 may be via wired or wireless connection for one or more access points 140 to connect to any of a plurality of networks 128. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links. Further, connectivity of any number of endpoint devices by the information handling system 100 to, for example, a communication network, may be available using any protocols related to communicatively coupling an endpoint device to any communication network.

Wireless adapter 120, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN standards, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier bands may operate at frequency bands of approximately 700 MHz, 800 MHz, 1900 MHz, or 1700/2100 MHz for example as well. Frequencies related to the 5G networks may include high frequency (HF) band, very high frequency (VHF) band, ultra-high frequency (VHF) band, L band, S band, C band, X band, Ku band, K band, Ka band, V band, W band, and millimeter wave bands.

Wireless adapter 120, in an embodiment, may connect to any endpoint device accessing an access point 140 using a plurality of radio frequency (RF) bands. For example, a 5G access point 140 may include those RF bands that emit RF waves either below 6 GHz (e.g., FR1) or higher than 6 GHz (e.g., FR2). In an embodiment, the wireless interface adapter 120 may be communicatively coupled to an array of antennas 132 used to provide a communication channel to an endpoint device, via an access point 140, with a communication channel found on any communication network described herein. The antennas 132 may support a 5G wireless communication protocol so that relatively higher amounts of data may be transmitted between the endpoint devices, through the access points 140 and evolved packet core 118 of the information handling system 100 to any communication network to which the information handling system 100 is communicatively coupled.

The wireless interface adapter 120 may further include an antenna front end system 125 which may operate to modulate and demodulate signals, set signal transmission power levels or sensitivity to signal reception, select channels or frequency bands, and conduct other functions in support of a wireless transmission from the access point 140 and to a communication network. The antenna adaptation controller 134 may execute instructions as disclosed herein for monitoring wireless link state information, endpoint configuration data, network slice data, access point 140 load data, or other input data to generate channel estimation and determine antenna radiation patterns. For example, instructions or a controller may execute software or firmware applications or algorithms which utilize one or more wireless links for wireless communications via the wireless interface adapter(s) 120 and the plurality of antenna systems 132 for the plurality of supported wireless protocols as well as other aspects or components.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 may be transmitted or received over the network 128 via the network interface device or wireless adapter 120.

The information handling system 100 may include a set of instructions 124 that may be executed to cause the computer system to perform any one or more of the methods or computer-based functions disclosed herein. For example, instructions 124 may execute an evolved packet core 118, a load balancing module 138, a network slicing module 140, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, the evolved packet core 118, the load balancing module 138, and the network slicing module 140 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124 including a look-up table used to determine or update a tier assigned to an endpoint device. The disk drive unit 116 and static memory 106 may also contain space for data storage. Further, the instructions 124 may embody one or more of the methods or logic as described herein. For example, instructions relating to the evolved packet core 118, the load balancing module 138, the network slicing module 140 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the evolved packet core 118, load balancing module 138, and network slicing module 140 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The evolved packet core 118, the load balancing module 138, and the network slicing module 140 may be stored in static memory 106, or the drive unit 116 on a computer-readable medium 122 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the evolved packet core 118 that may be operably connected to the bus 108. The computer readable medium 122 of the evolved packet core 118 may also contain space for data storage. The evolved packet core 118 may, according to the present description, perform tasks related to initiate a tiered communication network access policy by detecting the connection of an endpoint device to the communication network via one of a plurality of access points; receiving data descriptive of a tier assigned to the endpoint device; and determining if a communication channel is available on the communication network for the endpoint device to use. Again, the evolved packet core 118 may determine which of a plurality of communication networks the endpoint device is to be communicatively coupled to based on a plurality of characteristics of the endpoint device and data being or to be transmitted to and from that endpoint device.

In an embodiment, the evolved packet core 118 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

The information handling system 100 may also include the load balancing module 138 that may be operably connected to the bus 108. The computer readable medium 122 of the load balancing module 138 may also contain space for data storage. The load balancing module 138 may, according to the present description, perform tasks related to, based on the tier assigned to the endpoint device, determining which communication channel among a plurality of communication channels to allow the endpoint device to access the communication network with and determining which, among the plurality of access points within the network to facilitate the endpoint device to communicatively coupled to the communication network. In an embodiment, the load balancing module 138 may also reallocate endpoint device access to the one of the plurality of access points based on a number of endpoint devices communicatively coupled to the communication network via any of the access points of the plurality of access points; the tier assigned to each of the endpoint devices; and network slice requirements for each endpoint device.

In an embodiment, the load balancing module 138 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

The information handling system 100 may also include the network slicing module 140 that may be operably connected to the bus 108. The computer readable medium 122 of network slicing module 140 may also contain space for data storage. The network slicing module 140 may, according to the present description, perform tasks related to multiplexing of virtualized and independent logical networks on the same physical network infrastructure.

In an embodiment, the load balancing module 138 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

During operation, the evolved packet core 118 of the information handling system 100 may be communicatively coupled to a known number of access points 140. These access points may each be selectively communicatively coupled to an endpoint device. The endpoint device may be any type of computing device that may be communicatively coupled to a communication network via execution of the evolved packet core 118, load balancing module 138, and network slicing module 140 as described herein. The endpoint devices may be any one of a mobile cell phone, a laptop computing device, a desktop computing device, a tablet device, and a personal digital assistant device, among other types of endpoint devices that are attempting to establish communication with a communication network such as a private LTE communication network, a public WiFi communication network, a private WiFi communication network, a 4G LTE public communication network, or a 5G millimeter-wave (mm-wave) communication network, among other types of public and private communication networks.

In an embodiment, the endpoint device is communicatively coupled to the information handling system 100 via an access point 140. The access point 140 may be communicatively coupled to the information handling system 100 using any communication protocol including, but not limited to, 5G NR communication protocols, 4G LTE communication protocols, WiFi communication protocols, and citizens broadband radio service (CBRS) communication utilization protocols (such as a private LTE system). During operation, the access points 140 may communicate to the evolved packet core 118 certain characteristics regarding the endpoint device or the user of the endpoint device. Among these may be data descriptive of a tier assigned or to be assigned to the endpoint device or user of the endpoint device. The tiering process or assignment of a tier may be based on, in an embodiment, the user of the endpoint device. By way of example, a higher tier may be assigned to an endpoint device that is operated by a president of a high level executive of a company than, for example, a tier assigned to a lower ranked employee of that company. In this example, a guest at the company's physical site may be assigned an even lower tier when they use their endpoint devices to be communicatively coupled to any of the communication networks operated by the company. In an embodiment, the assignment of tier to an endpoint device may be based on the type of data being or to be transmitted by the endpoint device. For example, where a streaming presentation is being made and the communication channels provided through the information handling system 100 are being used, the tier assigned to the endpoint device may be assigned a top-tier or near top-tier assignment. In contrast, where the data being sent by the endpoint device is, for example, email data, the tier assigned to the endpoint device may be lower than that of the presentation-streaming endpoint device. In an embodiment, the assignment of tier to an endpoint device may be based on the level of data to be transferred through any given communication network by the endpoint device. For example, where the data to be transmitted includes data associated with certain internet-of-things (IoT) applications like 5G, Narrow-Band IoT (NB-IoT) and machine-to-machine (M2M) communications or data associated with autonomous driving applications, systems described herein may process top-tier assignment to these applications. Because these types of applications may require little to no latency and little or no denial of service, these endpoint devices operating these levels of data may be assigned the highest level of tier and may also be part of the decision to eliminate other communication connections between the communication networks and other endpoint devices or to eliminate other connections to these top tier assignment applications operating on designated endpoint devices.

The data descriptive of the tier assigned to each of the endpoints may be used to direct which endpoint devices may be communicatively coupled to which communication network. As described herein, the evolved packet core 118 may selectively allow for each of the endpoint devices to be communicatively coupled to one of a private LTE communication network, a public WiFi communication network, a private WiFi communication network, a 4G LTE public communication network, or a 5G millimeter-wave (mm-wave) communication network, among other types of public and private communication networks that the information handling system 100 forms a part of During this decision process, the evolved packet core 118 may determine if a specific communication channel (e.g., communication channels associated with any of the a private LTE communication network, a public WiFi communication network, private WiFi communication network, a 4G LTE public communication network, or a 5G mm-wave communication network, among other types of public and private communication networks) is available to an endpoint device that may be assigned to that specific communication channel. By way of example, where an endpoint is tiered to establish a 5G mm-wave communication on the communication network, the evolved packet core 118 may determine if such a channel is available, determine whether signal levels are sufficiently strong or have bandwidth available, and provide access to that communication channel even when such access may cause other lower-tiered endpoint devices to be dropped from that communication channel.

The evolved packet core 118 may also send endpoint tiered data to the load balancing module 138. The load balancing module 138 may receive this tiered data descriptive of the tier of each endpoint device and balance a network load over each of the available communication networks. In an embodiment, the load balancing module 138 may detect the number of endpoint devices communicatively coupled to each of the private LTE communication network, public WiFi communication network, private WiFi communication network, 4G LTE public communication network, or 5G millimeter-wave (mm-wave) communication network that are available to the endpoint devices. The load balancing module 138 may determine the resources used at each of the communication networks, the throughput at each communication network, response time at each communication network, among other factors to determine whether more or less endpoints may be communicatively coupled to any of the communication networks. In an embodiment, the various communication networks may be tiered as well such that the communication networks that offer faster speeds, higher throughput, and have coverage. For example a 5G mm-wave network may be tiered higher than a private LTE network due to the higher upload/download speeds and larger frequency spectrum of the 5G mm-wave networks than a private LTE. As such, the load balancing module 138 may execute instructions, parameters, and profiles 124 that communicatively couples the maximum number of endpoint devices to the 5G mm-wave network as possible without degrading network communications for any of the endpoint devices coupled to the 5G mm-wave network. Where there are more endpoint devices that the 5G mm-wave communication network can support, the load balancing module 138 may review the tiered data associated with each of the endpoint devices received from the evolved packet core 118 and allocate 5G mm-wave communication network to the highest tiered endpoint devices while allocating any remaining endpoint devices to, for example, a private 4G LTE communication network or other network available to the endpoint devices via the evolved packet core 118 and information handling system 100.

The 5G mm-wave communication network may also manage the number of endpoint devices that are communicatively coupled to any given access point 140 within the communication network. In an embodiment, the load balancing module 138 may be responsible for load balance these endpoint devices across a plurality of access points 140 within the network so that any given access point 140 that can take on additional endpoint devices may be rerouted to that access point 140 in order to provide better communication among the communication network. The load balancing module 138 may consider the tiering data associated with each endpoint device, the physical proximity of each endpoint device to any given access point 140, and the signal strength at each endpoint or access point 140 to reallocate the endpoint devices among the plurality of access points 140.

The evolved packet core 118 and load balancing module 138 may each or cooperatively execute instructions, parameters, and profiles 124 in order to load balance the various communication networks and assign each endpoint device to a specific communication network. Example pseudocode may include the following:

```

For managed networks j = 1 to max(networks) Do:
    -For AP(n); n= 1 to max(AP) DO:
        >For AP(n)T(m); m= 1 to maxTiersDO:
            -IF ( AP(n)T(m)connections >> AP(n-1)T(m)connections )
                -For T(m)endpoint(x); x= 1 to max(T(m)endpoints)
                    -IF ( AP(n)RSSI(endpoint(x)) <= AP(n-1)RSSI(endpoint(x)) )
                        -Move endpoint(x) to AP(n-1)
```

In this embodiment, for each access point 140, the load balancing module 138 may cycle through all endpoint devices and reallocate the endpoint devices such that each of the access points 140 within the network has roughly the same number of endpoint device connections per assigned tier. During operation of the information handling system 100, the load balancing module 138 may reallocate endpoint devices to a different access point 140 when, for example, a signal strength connection is the same or better than an existing connection. Other factors may be taken into consideration including the transmission capabilities of any given access point 140 and the diversity of tiered endpoint devices, among other considerations that improve the connection of the endpoint device to the access point 140.

The information handling system 100 further includes a network slicing module 140. The network slicing module 140 may enable the multiplexing of virtualized and independent logical networks on the same physical network infrastructure of which the information handling system 100 forms a part. This form of virtual network architecture combines principles behind software defined networking (SDN) and network functions virtualization (NFV) on a fixed network to increase flexibility. Network slicing may separate a control plane (CP) from the user plane to move the functionality of the user plane towards an edge of the network. Each network slice formed and managed by the network slicing module 140 may have its own architecture, provisioning management and security that supports a particular purpose associated with the purpose of the formation of the network slice. Considerations such as speed, capacity, connectivity, and coverage are allocated to meet the requirements of the network slice's objectives. In examples where the connection has low latency and adequate bandwidth, the prioritization of different tasks may be performed on a software level division of the network. The network slices that occupy a single physical network may be separated such that traffic and/or security breaches from one network slice does not interfere with another network slice formed and managed by the network slicing module 140.

In an embodiment, each network slice formed and managed by the network slicing module 140 may be isolated within the network and may be tailored to fulfill diverse network requirements. In an embodiment, a network slice formed and managed by the network slicing module 140 may be tailored to operate the transmission of data related to an IoT network that is used to manage a system of interrelated computing devices, mechanical and digital machines, and other objects that are provided with unique identifiers (UIDs) and transfer data over the sliced network. In an embodiment, a network slice formed and managed by the network slicing module 140 may be tailored to operate the transmission of data related to an autonomous driving process or processes. In this embodiment, the autonomous driving processes may send and received data descriptive of the conveyance of a driverless car. As it may be appreciated, the data transmission during the operation of the autonomous driving processes may include a significant amount of data that, if not relayed appropriately, could result in damage to property or injury to humans during operation. As such, the network slice formed by the network slicing module 140 and used to drive data related to an autonomous driving system may be given top-tier priority at, for example, a 5G mm-wave communication network. In an embodiment, a network slice formed and managed by the network slicing module 140 may be tailored to operate the transmission of data related to a mobile broadband system or monitoring the IoT smart devices of a lower level tier such as a smart lighting system (light bulb) or environmental sensor (general HVAC temperature or humidity). In this embodiment, the data transmitted at this network slice may be reallocated to a lower-tiered communication network such as a private LTE communication network.

In an embodiment, the network slicing module 140 may cooperate with the load balancing module 138 to load balance the network connections on any given network slice. In an embodiment, for each access point 140, the load balancing module 138 may cycle through all endpoint devices so as to reallocate those endpoint devices such that each access point 140 has roughly the same number and/or diversity of connections based on the network slice formed and managed by the network slicing module 140. In an embodiment, the network slicing module 140 may slice the network into slices based on the connection requirements the slice is to be used for. During operation, the endpoint devices may be reallocated to a new access point 140 if the signal strength is the same or better at another access point 140. Similarly, the endpoint device may be reallocated to another network slice by the network slicing module 140 when the requirements of the endpoint device do not fit the networked purpose of the slice. Pseudocode used in coordination to operate the network slicing module 140 and load balancing module 138 may be as follows:

```
For managed networks j = 1 to max(networks) Do:
    -For AP(n); n= 1 to max(AP) DO:
        >For AP(n)S(m); m= 1 to maxSlicesDO:
            -IF ( AP(n)Slice(m)connections >> AP(n−1)Slice(m)connections )
                -For Slice(m)endpoint(x); x= 1 to max(Slice(m)endpoints)
                    -IF ( AP(n)RSSI(endpoint(x)) <= AP(n−1)RSSI(endpoint(x)) )
                        -Move endpoint(x) to AP(n−1)
```

Figure 2:
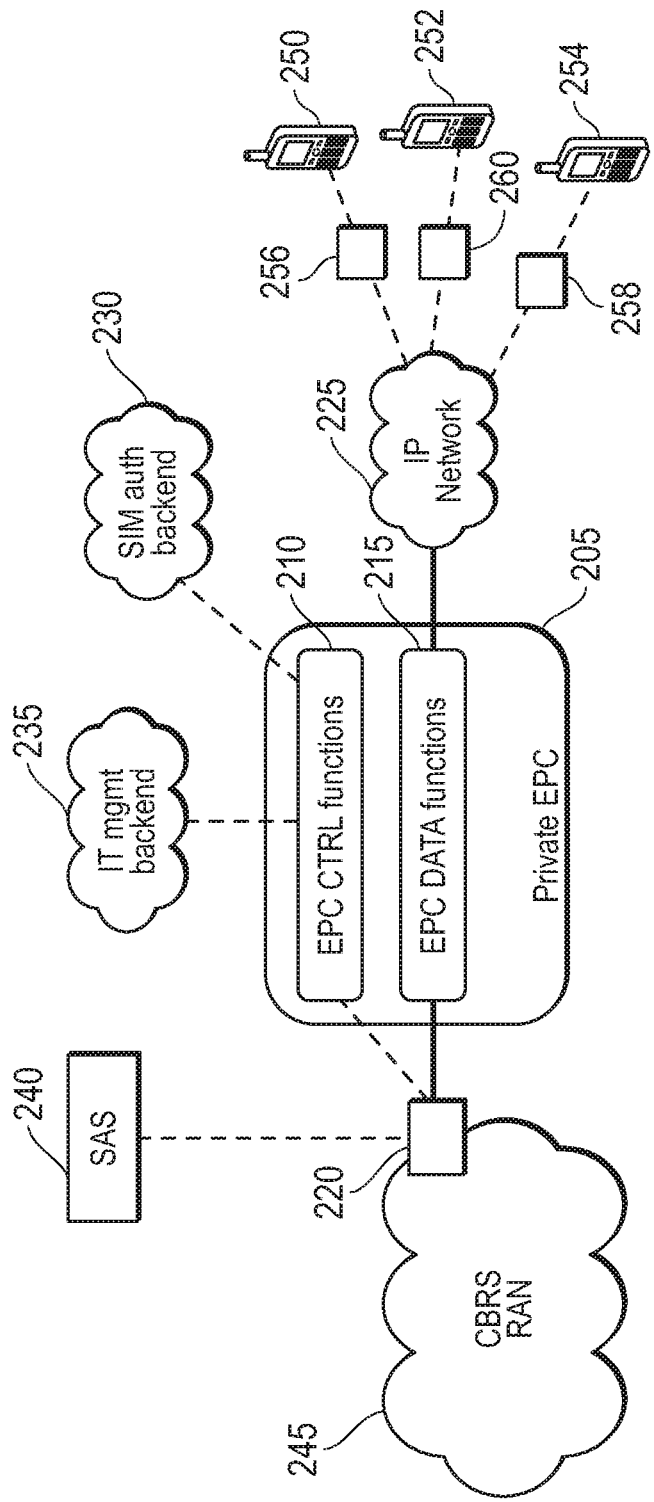
FIG. 2 is a block diagram illustrating a private evolved packet core system included within a communication network according to an embodiment of the present disclosure.

FIG. 2 is a block diagram illustrating an information handling system 200 included within a communication network according to an embodiment of the present disclosure. In this embodiment, the information handling system 200 includes a private evolved packet core 205 that is used to communicatively couple a plurality of endpoint devices 250, 252, 254 to one of a plurality of communication networks. The private evolved packet core 205 may be the logical backbone for providing voice and/or data on the communication networks associated with the private evolved packet core 205. In an embodiment, the private evolved packet core 205 may manage across various wireless protocol functions and routing as well as maintain various wireless protocol specific database contents for a plurality of wireless protocols that may be offered by an organization or enterprise and managed by information technology managers.

The endpoint devices 250, 252, 254 may be coupled to the information handling system 200 via an access point 256, 258, 260 and an internet protocol (IP) network 225. The IP network 225 may include the private evolved packet core 205 that executes instructions, parameter, and profiles so that voice and data communication requests from the endpoint devices 250, 252, 254 may be received and routed to a communication network as described herein. The execution of the private evolved packet core 205 may serve as a gateway for the endpoint devices 250, 252, 254 to be communicatively coupled, for example, to a private LTE communication network, a public WiFi communication network, a private WiFi communication network, a 4G LTE public communication network, or a 5G millimeter-wave (mm-wave) communication network, among other types of public and private communication networks. The allocation and, in some examples, reallocation of the assignment of any given endpoint device 250, 252, 254 to a specific communication network may be dependent on a number of characteristics related to the endpoint devices 250, 252, 254, users of the endpoint devices 250, 252, 254, the type of data being transmitted across the private evolved packet core 205, a virtual network slice accessed by the endpoint devices 250, 252, 254, and the access point (AP) accessed through which the endpoint devices 250, 252, 254 communicate to the private evolved packet core 205, among other characteristics described herein.

The private evolved packet core 205 may include evolved packet core (EPC) control functions 210 and EPC data functions 215. The EPC control functions 210 may include those instructions, parameters, and algorithms that causes the endpoint devices 250, 252, 254 to be routed to a specific communication network that may include one of a private LTE communication network, a public WiFi communication network, a private WiFi communication network, a 4G LTE public communication network, or a 5G millimeter-wave (mm-wave) communication network, among other types of public and private communication networks. The EPC data functions 215 may include that data used by the private evolved packet core 205 to determine the tier assigned to any specific endpoint device 250, 252, 254. As described herein, each of the endpoint devices 250, 252, 254 may be assigned a tier that is reflective of that endpoint devices' 250, 252, 254 importance and/or communication network requirements. In an embodiment, the private evolved packet core 205 may include a memory device that maintains a look-up table. The look-up table may include data that describes the individual endpoint devices 250, 252, 254 as well as a correspondingly assigned tier to each endpoint device 250, 252, 254. As any given endpoint device 250, 252, 254 is communicatively coupled to the IP network 225 and private evolved packet core 205, the private evolved packet core 205 may detect, for example, a MAC address or other endpoint device 250, 252, 254 identification and then look up the endpoint device 250, 252, 254 identification on the look-up table. Where any endpoint device 250, 252, 254 is not listed on the look-up table, the private evolved packet core 205 may use other data to assign a tier to the endpoint device 250, 252, 254. This other data may include the type of data to be transmitted by the endpoint devices 250, 252, 254 and the status of the user operating the endpoint devices 250, 252, 254, among other characteristics described herein.

The private evolved packet core 205 may be communicatively coupled to a SIM authentication backend 230. The SIM authentication backend 230 may also be used to identify the mobile operator that issued a SIM card associated with the endpoint devices 250, 252, 254. In an embodiment where an LTE network or private LTE network is being accessed by the endpoint device 250, 252, 254, the SIM authentication backend 230 may monitor for any endpoint device 250, 252, 254 that is intended to be used on the private LTE network and confirm that these endpoint devices 250, 252, 254 have a SIM card.

The private evolved packet core 205 may also include an IT management backend 235. The IT management backend 235 may allow for the modification of any criteria or processes at the private evolved packet core 205 as described herein. For example, the decision processes or algorithms used to direct an endpoint device 250, 252, 254 to a communication network may be altered using the IT management backend 235.

A one of a plurality of communication networks, the private evolved packet core 205 may be communicatively coupled to a citizen broadband radio service (CBRS) radio access network (RAN) 245. The CBRS RAN 245 may, in an example, include a 150 MHz wide broadcast band of the 3.5 GHz band. The CBRS RAN 245 may be communicatively coupled to the private evolved packet core 205 via operation of a spectrum access system (SAS) 240 at a CBRS base station 220. The SAS 240 may be responsible for protecting endpoint devices 250, 252, 254 operating on the CBRS RAN 245 spectrums from harmful interference from the deployment of new endpoint devices 250, 252, 254 on the CBRS RAN 245 spectrums and to manage access priorities from legacy government access and legacy private/industry priority accesses to the CBRS bandwidth. During operation the CBRS base station 220 may provide coordinates (e.g., latitude, longitude, and altitude) to the SAS 240. Based on this information, the SAS 240 provides the CBRS base station 220 with a list of communication channels (e.g., frequencies) not already in use within the CBRS RAN 245 spectrum.

Thus, the private evolved packet core system 205 may thus conduct a process to navigate among allocation of the CBRS RAN 245 as well as any other type of communication network access via access points such as 256, 258, 260. The type of communication network access managed by central plane management for tiers, signal availability and quality, bandwidth and other factors of embodiments described herein include the private LTE communication network on CBRS or other, a public Wi-Fi communication network, a private WiFi communication network, a 4G LTE public communication network, or a 5G millimeter-wave (mm-wave) communication network, among other types of public and private communication networks made available by the enterprise operating the private evolved packet core system 205.

Figure 3:
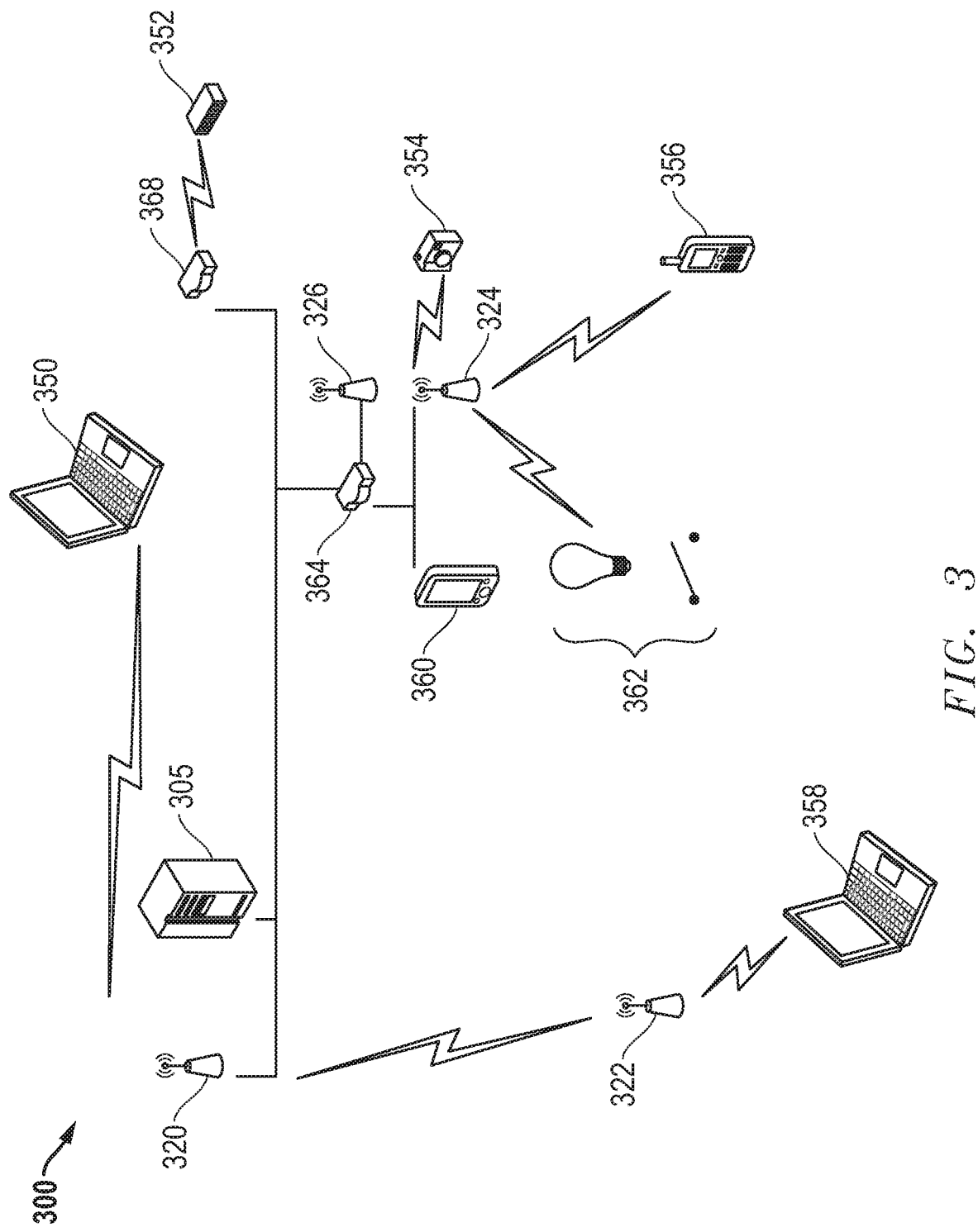
FIG. 3 is a block diagram illustrating a central plane managed network having a plurality of network topologies and endpoint devices for management by a private evolved packet core system according to an embodiment of the present disclosure according to an embodiment of the present disclosure.

FIG. 3 is a block diagram illustrating a central plane managed network having a plurality of network topologies and endpoint devices for management by a private evolved packet core system according to an embodiment of the present disclosure. In an example embodiment, the private evolved packet core system may operate on one or more information handling systems 305 included within the privately administered communication network offering a plurality of network protocol topologies. The information handling system 305 may, in the embodiment shown in FIG. 3, may be in the form of a server computing device. In an embodiment, the information handling system or systems 305 operating the private evolved packet core system with network slicing and load balancing capabilities may be a cloud server that includes stable DNS routing, data aggregation. The endpoint devices 350, 352, 354, 356, 358, 360, or 362 may push data to the information handling system or systems 305 operating the private evolved packet core system or from which the private evolved packet core system which may manage data from the endpoint devices for communication via multiple wireless protocol network topologies.

In an embodiment, the information handling system 305 may be communicatively coupled to a plurality of access points 320, 322, 324, 326. Each access point 320, 322, 324, 326 may allow for a distinct endpoint device 350, 352, 354, 356, 358, 360, or 362 to be communicatively coupled to the information handling system or systems 305 operating the private evolved packet core system. In an embodiment, the access points 320, 322, 324, 326 may facilitate the remote access of an endpoint device such as a laptop mobile device 350, 358, smart phone 356, or even a tablet device 360 (shown with a wired connection). The remote access may transmit cellular data to the information handling system or systems 305 using a port forwarding process. In an embodiment, the endpoint device such as a laptop mobile device 350, 358, smart phone 356, or even a tablet device 360 may use a global system of mobile communications (GSM) standard, a general packet radio service (GPRS) standard, or an LTE protocol to remotely access one or a series of access points 320, 322, 324, 326 in order to be communicatively coupled to the information handling system 300. In some embodiments the endpoint device such as a laptop mobile device 350, 358, smart phone 356, or even a tablet device 360 may use narrowband (NB) IoT radio technology to communicatively couple the endpoint device such as a laptop mobile device 350, 358, smart phone 356, or even a tablet device 360 to the information handling system or systems 305. Additionally, or alternatively, the endpoint device such as a laptop mobile device 350, 358, smart phone 356, or even a tablet device 360 may be mediated by a terminal or hub 364 or 368 for central plane management by the private evolved packet core system or portions thereof with limited no interaction with the information handling system or systems 305 necessary.

In an embodiment, the information handling system 300 may be communicatively coupled to an IoT device such as a camera system 354, or a smart lighting system or a smart switch system 362. The number of types of IoT devices 354 and 362 may be varied and may, according to an embodiment of the present disclosure, be directed to use a specific network slice by the information handling system 300 as described herein. For example, one or more IoT devices may include devices for environmental monitoring such as temperature, humidity, light levels or the like. Again, each of the IoT devices 354, 362, or others may be communicatively coupled to the information handling system or systems 305 via an access point 324 or 326 that may or may not be shared with other types of endpoint devices 350, 352, 354, 356, 358, 360, or 362.

In an embodiment, the information handling system or systems 305 may be communicatively coupled to an endpoint device, such as tablet device 360, via a wired connection. The wired connection may be, for example, an ethernet connection that is routed to the information handling system 305 via a hub or router 364. In any embodiment, the hub or router 364 may be communicatively coupled to an access point 326 that provides WiFi and/or other low-power radio frequency (RF) protocols. In the embodiments presented herein, such WiFi and lower-power RF protocols may be used by any of the endpoint devices 350, 352, 354, 356, 358, 360, or 362 to be communicatively coupled to the information handling system or systems 305. In some embodiments, a remote location endpoint devices 350, 352, 354, 356, 358, 360, or 362 may be communicatively coupled to any number or type of local hubs or router 364 or 368 so that multiple other of the endpoint devices 350, 352, 354, 356, 358, 360, or 362 may be communicatively coupled to each other and with the information handling system 305 or local hubs or routers 364 or 368 providing central plane management of data for wireless signal management, data slices, and tiering of the private evolved packet core system.

In an embodiment, each of the various types of endpoint devices 350, 352, 354, 356, 358, 360, or 362 may be communicatively coupled to one or more access points 320, 322, 324, 326 and assigned a tier by the private evolved packet core system operating at the information handling system 305 or hubs 364 or 368 as described herein. In addition to being assigned a tier, the endpoint devices 350, 352, 354, 356, 358, 360, or 362 may be placed on a network slice based on the type of data being transmitted, the type of endpoint device 350, 352, 354, 356, 358, 360, or 362, and the tier assigned to the endpoint device 350, 352, 354, 356, 358, 360, or 362, among other factors as described herein. The utilization of the network slices and tiering of the endpoint devices 350, 352, 354, 356, 358, 360, or 362 may balance the communication network connections across 300 while also moving endpoint devices 350, 352, 354, 356, 358, 360, or 362 so that the network slices are optimized as described herein. Additionally, through the use of the network slices and tiering of the endpoint devices 350, 352, 354, 356, 358, 360, or 362 the bandwidth across the plurality of communication networks may be balanced increasing the effectiveness of the central plane management of the private evolved packet core system and network 300. In a specific embodiment as described herein, the private evolved packet core system may use certain network slicing parameters, tiering statuses of the endpoint devices 350, 352, 354, 356, 358, 360, or 362, physical proximity of the endpoint devices 350, 352, 354, 356, 358, 360, or 362 to the access points 320, 322, 324, 326, and signal strength, signal quality, or bandwidth detected to reallocate the endpoint devices 350, 352, 354, 356, 358, 360, or 362 to other access points 320, 322, 324, 326, communication networks, or network slices. This reallocation may be done so as to optimize an over network of network topologies increasing the functionality of the network and endpoint devices described herein. In a specific embodiment, the private evolved packet core system may, for each network topology, cycle through all endpoint device 350, 352, 354, 356, 358, 360, or 362 connections and reallocate those connections such that each network slice has roughly the same number of endpoint device 350, 352, 354, 356, 358, 360, or 362 connection and each connection is optimized based on the connection type (e.g., autonomous cars, mission critical processes, streaming processes, and IoT processes, among others).

In an alternative embodiment, the reallocation may be based on load balancing bandwidth while optimizing connection type across the network slices. Connections, in this embodiment, may be reallocated based on connection requirements (e.g., latency, reliability, bandwidth, velocity, among other factors) such that endpoint devices 350, 352, 354, 356, 358, 360, or 362 are only moved to a new network slice when a signal strength, signal quality, or bandwidth is the same or better via another access point 320, 322, 324, 326.

Figure 4:
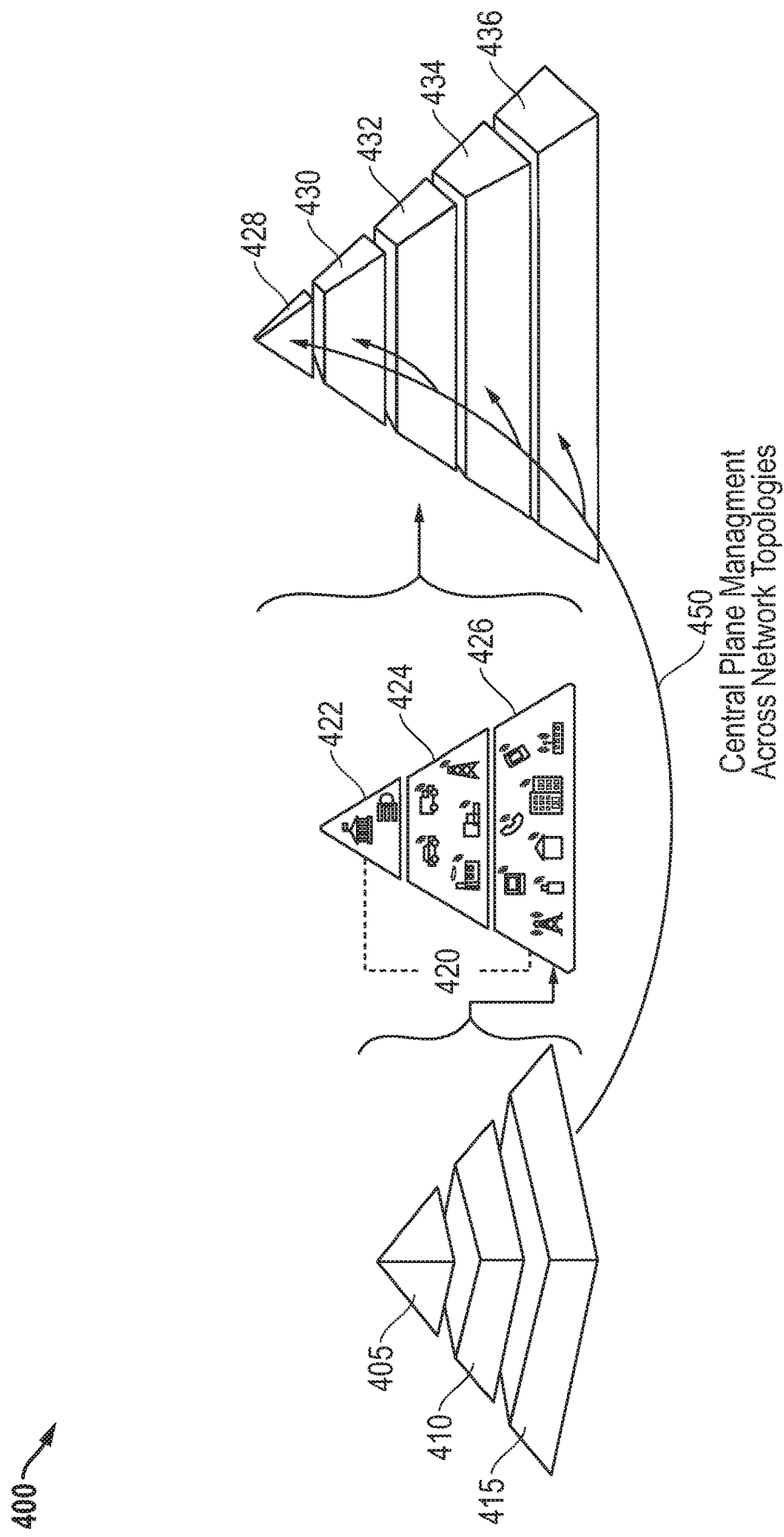
FIG. 4 is a block diagram illustrating the allocation of various tiers of users to a communication protocol according to an embodiment of the present disclosure.

FIG. 4 is a block diagram illustrating the allocation of various tiers 405, 410, 415 of users to a communication protocol according to an embodiment of the present disclosure. The tiers 405, 410, 415 presented in FIG. 4 shows a three-tiered system that may be used with the private evolved packet core system for central plane management 450 across multiple wireless protocol network topologies 428, 430, 432, 434, or 436 according to an example embodiment. However, the present specification contemplates that any number of tiers 405, 410, 415 may be used to separate some endpoint devices from others with the private evolved packet core system for central plane management 450 across multiple wireless protocol network topologies according to embodiments herein. The tiers 405, 410, 415 described in FIG. 4 may include a "mission critical" IoT tier or other high value tier 405 such as an executive tier or a mission critical application tier, an employee tier or other middle level tier 410, and a guest tier or general access tier 415. Although FIG. 4 may describe these tiers 405, 410, 415 as including specific types of endpoint devices and/or users, the present specification contemplates that any type of delineation of tiers may be created by any particular network system to fit any particular needs of that network.

As described herein, the mission critical IoT tier or other high value tier 405 may include those interrelated endpoint devices, mechanical and digital machines, and objects that are provided with a unique identifier (UID) and include the ability to transfer data over the communication network slices described herein. In some examples, the mission critical IoT devices may operate without human interaction with those devices while other devices may execute applications with mission critical functions at certain times. These devices associated with the mission critical IoT tier or other high value tier 405 may work in the background and require high bandwidth throughput to continue working. Although FIG. 4 shows that mission critical IoT tier or other high value tier 405 is the highest tier in the list of tiers, the present specification contemplates that other types of tiers may be created and assigned a highest tier rating based on certain other network priorities such as user based tier designation or application based tier designation such as those executing critical activities such as video conferencing or manufacturing line control applications.

The employee tier or middle level tier 410 may be a tier assigned to any communicatively coupled endpoint device that has been assigned to or used by an employee. In order to determine whether the endpoint device is assigned to or operated by an employee the information handling systems described herein may access a look-up table that includes endpoint device identifications and corresponding tier assignments of those endpoint devices. Where no endpoint device data is found on the look-up table, additional data may be used to identify the endpoint device as being associated with an employee and, therefore, qualified to be assigned to the employee tier or middle level tier 410. This additional data may include passwords, usernames, and other security data that would signify to the information handling system that any specific endpoint device should be assigned, at least initially, to the employee tier or middle level tier 410.

In the embodiment shown in FIG. 4, the lowest, general access tier 415 is assigned to those endpoint devices that do not qualify as mission critical IoT tier or other high value tier 405 devices or employee tier or middle level tier 410 devices. These guest or general access endpoint devices may include those devices seeking to use the private communication networks managed by the information handling system on a temporary basis. Again, where no endpoint device identification or security information is provided, the information handling system may automatically assign these guest tier or general access tier 415 endpoint devices as such.

It may be appreciated that, upon assignment of either a mission critical IoT tier or other high value tier 405, an employee tier or middle level tier 410, or a guest tier or general access tier 415, the information handling system may, at least initially, assign those endpoint devices to a specific communication network. These communication networks may include, for example, a private 4G LTE communication network 430, a public WiFi communication network 436, private WiFi communication network 434, a 4G LTE public communication network 430, a CBRS RAN communication network 432, or a 5G mm-wave communication network 428, among other types of public and private communication networks such as made available by an enterprise executing the private evolved packet core system for central plane management 450 across multiple wireless protocol network topologies. By way of example, a top-tiered endpoint device such as the mission critical IoT tier or other high value tier 405 devices may be initially assigned to the 5G mm-wave communication network 428. Additionally, the employee tier or middle level tier 410 endpoint devices may be assigned to any of the 5G mm-wave communication network 428, private 4G LTE communication network 430, or private WiFi communication network 434 at least initially. Similarly, the guest tier or general access tier 415 endpoint devices may, at least initially, be assigned to a private WiFi communication network 434 for example.

During operation of the information handling system and the tiered system shown in FIG. 4, any type of tiered endpoint device 405, 410, 415, may be assigned to any of the communication networks if and when such channels exists and bandwidth is available at those channels. Thus, in some embodiments, the guest tier or general access tier 415 endpoint devices may be communicatively coupled to the 5G mm-wave communication network 428 when other higher tiered endpoint devices are not communicatively coupled to the 5G mm-wave communication network 428 or additional bandwidth is available within the 5G mm-wave communication network 428. This reallocation of these tiered endpoint devices allows for the maximum bandwidth and throughput at the communication networks may occur upon execution of the reallocation processes described herein.

The private evolved packet core system operating central plane management 450 across multiple wireless protocol network topologies via the tiered statuses of the endpoint devices may include at least one network topology of a CBRS RAN communication network 432, such as a private LTE operating eNodeB access points on such a bandwidth in an enterprise. Use of a CBRS RAN communication network 432 may require implementation of the SAS 420 as described herein to manage access priorities to the CBRS bandwidth for government access priority tier 422, or legacy private or industry priority tier 424 which have priority over general access tier 426 which may be used by the CBRS RAN communication network 423. These higher priority SAS levels, although uncommonly occupied, may block the CBRS RAN communication network 423 of the enterprise. In a specific embodiment, the private evolved packet core system operating central plane management 450 across multiple wireless protocol network topologies must manage access priority limitations that may arise with the SAS 420 to direct and coordinate the connection of any tiered endpoint device based, in part or whole, available access priority to the CBRS band.

The embodiments herein manage wireless access and network slice and tier allocations to a variety of available access points across multiple wireless protocol network topologies as conducted by the private evolved packet core system operating central plane management 450 according to embodiments herein. For example, the private evolved packet core system operating central plane management 450 across multiple wireless protocol network topologies may utilize designations of top-tiered endpoint devices 405 that may include those devices associated with mission critical IoT systems networks and also those endpoint devices incumbent to the operations of, for example, a company such as an executive or a particular application on other endpoint devices given precedent over any other device for being operated over the certain communication. Similarly, second tiered devices 410 may include those devices associated with employee operations and that are given some priority access. These may include those endpoint devices associated, for example, with day to day operations and communications among employees which may be able to access unused bandwidth on highest priority network protocol topologies if available. Still further, a lowest tier endpoint device 4 may include those devices that are deemed to be general access endpoint devices such as mobile phones of a visitor may be shifted to bandwidth remaining an any level of the available multiple wireless protocol network topologies.

Figure 5:
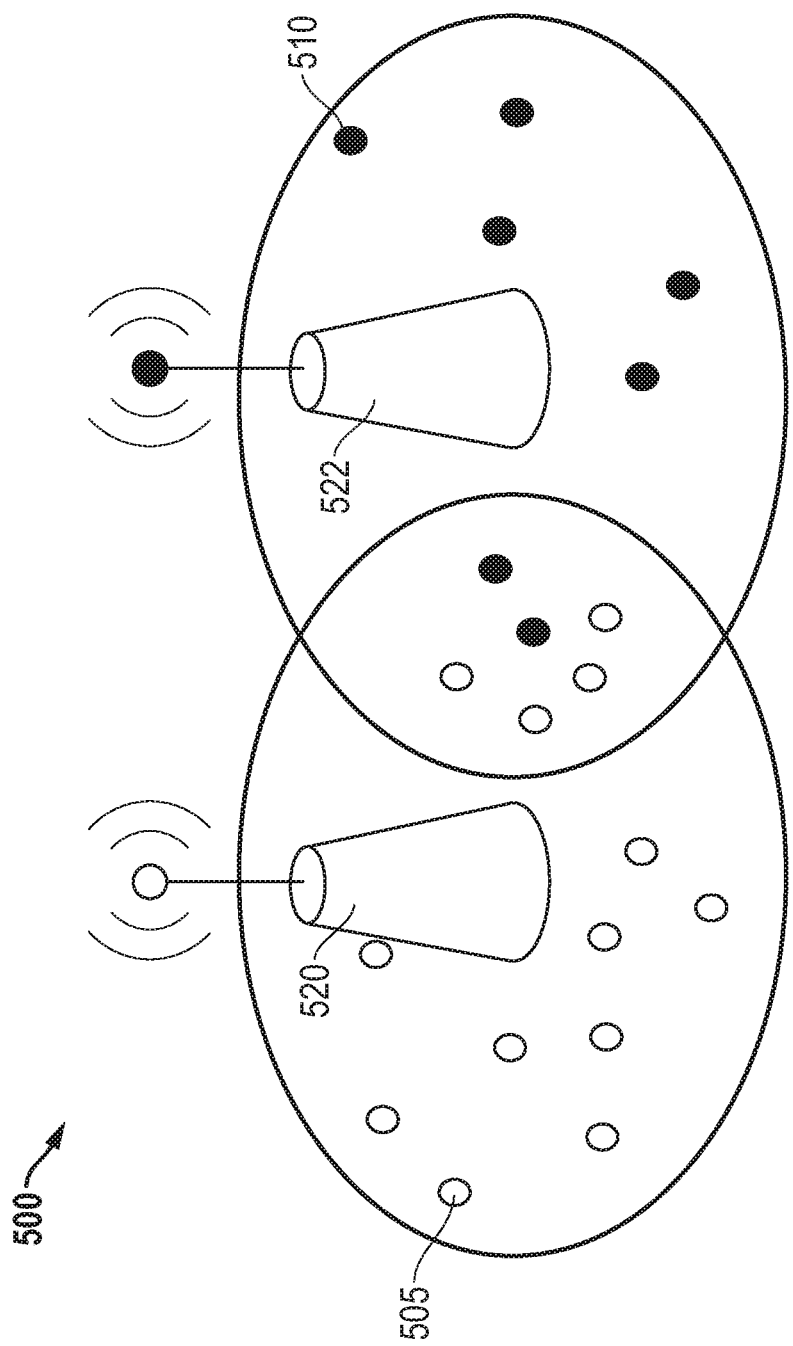
FIG. 5 is a block diagram illustrating the assignment of various endpoint devices to an access point according to an embodiment of the present disclosure.

FIG. 5 is a block diagram illustrating the assignment of various endpoint devices 505, 510 to an access point 520, 522 according to an embodiment of the present disclosure. As described herein, a load balancing module may perform tasks related to, based on the tier assigned to the endpoint device 505, 510, determining which communication channel among a plurality of communication channels to allow the endpoint device to access the communication network with and determining which, among the plurality of access points within the network to facilitate the endpoint device to communicatively coupled to the communication network. In an embodiment, the load balancing module may also reallocate endpoint device 505, 510 access to the one of the plurality of access points 520, 522 based on a number of endpoint devices 505, 510 communicatively coupled to the communication network via any of the access points 520, 522 of the plurality of access points 520, 522; the tier assigned to each of the endpoint devices 505, 510; and network slice requirements for each endpoint device 505, 510. In other words, it is contemplated that private evolved packet core system operating central plane management 450 across multiple wireless protocol network topologies will include multiple access points beyond the two access points 520, 522 that are depicted for simplicity of illustration. Multiple access points from a plurality of wireless protocol network topologies will be available to various endpoint devices 505 and 510 for access to the enterprise central plane managed wireless networks in embodiments herein.

In a specific embodiment, the load balancing module may also determine a distance between any given endpoint device 505, 510 and the plurality of access points 520, 522 in order to determine whether a physical proximity or signal strength between the access points 520, 522 and endpoint device 505, 510 necessitate a reallocation. In this embodiment, along with the tier data associated with the endpoint device 505, 510, this distance data and signal strength data may allow for reallocation at the access points 520, 522. This may be especially true where, for example, where the information handling system described herein is also reallocating the endpoint devices 505, 510 based on an assigned network slice and tier status to load balance and optimize the connections across all available networks.

By way of example, a first WiFi access point 520 may have 100 top-tiered endpoint devices 505, 510 communicatively coupled thereto with 500 other sub-tiered endpoint devices 505, 510 communicatively coupled thereto. A second LTE access point 522 may have 20 top-tiered endpoint devices 505, 510 communicatively coupled thereto with 100 sub-tiered endpoint devices 505, 510 communicatively coupled thereto. In this example application of the processes and methods described herein, a number of top-tiered endpoint devices 505, 510 may be reallocated to the first WiFi access point 520 to the second LTE access point 522 based on a proximity and other parameters such that the network and interference loading is more evenly distributed. By proceeding through this process, the network slicing and tiering processes may be used to balance endpoint-to-network connections while endpoint devices 505, 510 are reallocated to optimize any given communication network or network slice and balance network bandwidth throughout.

Figure 6:
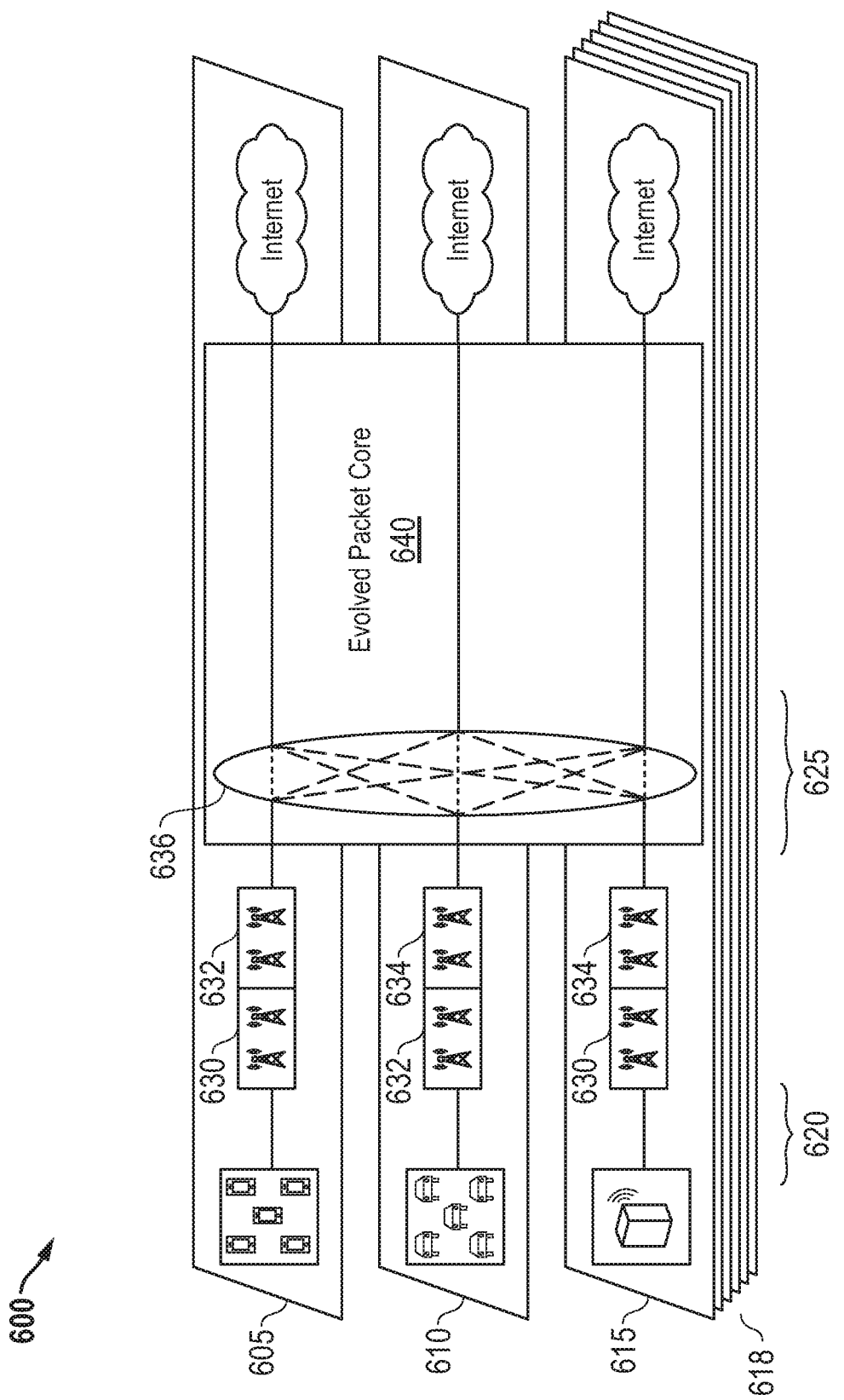
FIG. 6 is a block diagram of a private evolved packet core system within a sliced network according to an embodiment of the present disclosure.

FIG. 6 is a block diagram of a private evolved packet core system 640 operating central plane management across multiple wireless protocol network topologies 630, 632, and 634 within a sliced network 600 according to an embodiment of the present disclosure. As described herein, the sliced network 600 may be sliced using a network slicing module of a private evolved packet core system 640. The network slicing module may implement one or more of a vertical network slicing or a horizontal network slicing process. These two different processes may be implemented to, respectively, allow for resource sharing between different services and applications and to enhance available wireless quality of service (QoS), such as signal strength, bandwidth or the like, or allow for resource sharing among different network nodes to enhance the capabilities of less capable network nodes. In either embodiment, each network slice 605, 610, 615 can be optimized to provide the required resources and wireless QoS to meet the diverse set of requirements for each service. By way of example, a first network slice 605 may be relegated to a mobile broadband slice. In this embodiment, the first network slice 605 may virtually separate those processes associated with the mobile broadband processes to optimize the operational processes so that these processes may be made more streamlined. Similarly, a second network slice 610 may be virtually separated to include those mission critical autonomous driving operations associated with self-driving vehicles. The autonomous driving operations may include large amounts of data transmissions that allow a vehicle to drive with no human interaction. The formation of this second network slice 610, therefore, allows the sliced network 600 to have high throughput, high bandwidth, and low latency resources available to conduct these operations without damage to property or harm to humans. Additionally, the sliced network 600 may include a third network slice 615 that is associated with operations related to IoT devices and their operations. In this example, the third network slice 615 may optimize those processes associated with the operation of those IoT devices that may, for example, require low latency. A plurality of slices 618 are contemplated to be utilized by the private evolved packet core system 640 for central plane management of the multiple wireless protocol network topologies 630, 632, and 634 made available by the enterprise for endpoint devices.

In an embodiment, any number of radio access networks 630, 632, 634 may be used to communicatively couple each of the endpoint devices to the evolved packet core 640 via a fronthaul 620 portion of the communication network architecture. As described herein, the of a private evolved packet core system 640 may be executed on any device or devices that execute instructions, parameter, and profiles so that voice and data communication requests from the endpoint devices may be received and routed to a communication network as described herein. The execution of the private evolved packet core system 640 operating central plane management across multiple wireless protocol network topologies 630, 632, and 634 within a sliced network 600 may serve as a gateway for the endpoint devices to be communicatively coupled, for example, to a private LTE communication network, a public WiFi communication network, a private WiFi communication network, a 4G LTE public communication network, or a 5G millimeter-wave (mm-wave) communication network, among other types of public and private communication networks. The allocation and, in some examples, reallocation of the assignment of any given endpoint device to a specific communication network may be dependent on a number of characteristics as described in embodiments herein related to the endpoint device, user of the endpoint device, the type of data being transmitted across the evolved packet core 640, a virtual network slice accessed by the endpoint device, and the access point (AP) accessed through which the endpoint device communicates to the private evolved packet core system 640 executing central plane management, among other characteristics described herein. In an embodiment, the sliced network 600 may include a backhaul portion 625 or any other portion of the communications network that includes intermediate links between the evolved packet core 640 and the radio access networks 630, 632, 634.

In embodiments herein, private evolved packet core system 640 operating central plane management across multiple wireless protocol network topologies 630, 632, and 634 within a sliced network 600 may operate to allocate, reallocate, or switch via central plane management, the designations of endpoint devices or access points 630, 632 or 634 or their data flows via wireless connection based on the plurality of tiering and slice allocation embodiments by the private evolved packet core system 640 and the endpoint devices detected as accessing the enterprise administered multiple wireless protocol network topologies 630, 632, and 634. The private evolved packet core system 640 operating central plane management across multiple wireless protocol network topologies 630, 632, and 634 within a sliced network 600 may operate a reallocation module 636 for such designations. In example embodiments, the private evolved packet core system 640 operating central plane management across multiple wireless protocol network topologies 630, 632, and 634 within a sliced network 600 may operate the reallocation designations among multiple virtual networks for use of the plurality of wireless protocol network topologies 630, 632, and 634.

In slicing the network as described above, the private evolved packet core system 640 operating central plane management may utilize principles behind software defined networking (SDN) and access network functions virtualization (NFV) on the fixed network or plurality of networks to provide the reallocation operations 636. In this way, the control plane is separated from the user plane providing network slices within a fixed network architecture, provisioning management, and security for each use or system tiering, accessibility, bandwidth, signal quality, or others to allocate speed, capacity, connectivity and coverage relating to use cases as described in embodiments herein. Thus, upon determining a state of wireless QoS including latency levels, as well as whether threshold levels of bandwidth are met, the reallocation module may assign prioritization of tasks from tiered endpoint devices or applications on a software level of division of data to be wireless transmitted across the plural wireless protocol network topologies 630, 632, and 634 according to the slices 605, 610, 615, or 618. Each of the slices 605, 610, 615, or 618 occupying a single physical network may be separated accordingly and traffic and security issues from one slice cannot interfere with the other slices. Movement of endpoint devices may be moved between access points of plural wireless protocol network topologies 630, 632, and 634 may be based on whether signal connections are the same or better than existing signal conditions in some embodiments. Further, movement of endpoint devices may be moved between access points of plural wireless protocol network topologies 630, 632, and 634 in central plane management may be based on and may be assigned or prioritized on the various tier levels by the private evolved packet core system 640 operating in various embodiments.

Figure 7:
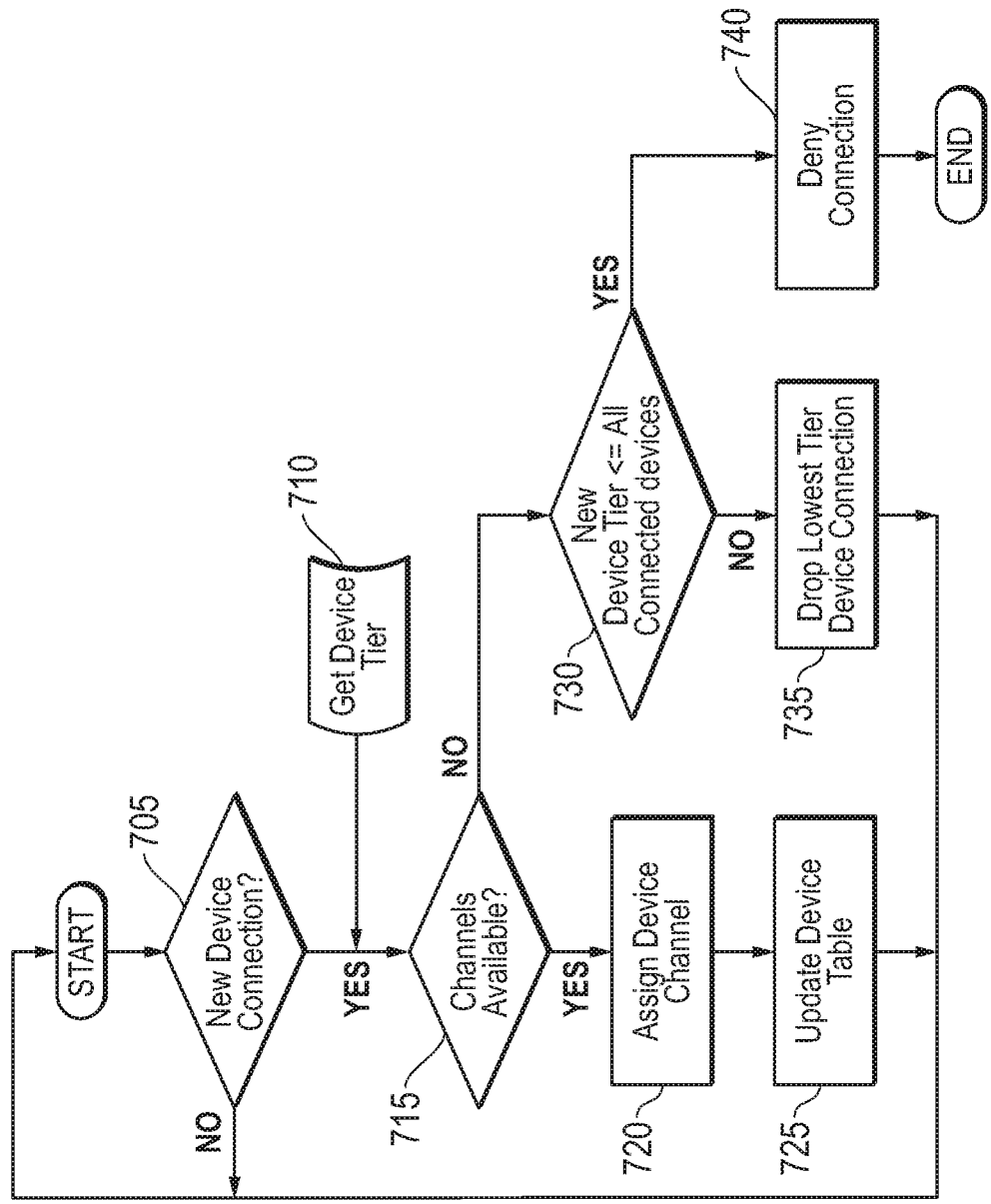
FIG. 7 is a flow diagram illustrating a method of managing data connections to a communication network with multiple wireless protocol network topologies according to an embodiment of the present disclosure.

FIG. 7 is a flow diagram illustrating a method 700 of managing data connections to a communication network via a private evolved packet core system operating central plane management across multiple wireless protocol network topologies within a sliced network according to an embodiment of the present disclosure. The method 700 may include, at block 705, with the detection of a new device at, for example, an evolved packet core associated with a communication network. As described herein, the evolved packet core may be any device or devices that execute instructions, parameter, and profiles so that voice and data communication requests from endpoint devices may be received and routed to a communication network as described herein. If no new device is detected, the method 700 may return to start for continued monitoring and central plane management among the plurality of endpoint devices and across the multiple wireless protocol network topologies within the sliced network by the private evolved packet core system for a new device or modified tiering assignment. During this detection of the new device at block 705, the evolved packet core may receive or request data from the endpoint device at block 710 for cross reference with a database for tier identification. This data includes, at least, a designated tier that the endpoint device is assigned or data to determine the designated tier appropriate for the new endpoint device based on cross reference of information from a tier database set of parameters for the evolved packet core system. For example, an identification of MAC address, username, login or the like may identify a high level executive or other employee or information relating to operation of prioritized software systems or hardware systems (e.g., autonomous driving) in requested data may be cross referenced to identify tier designation. The tier defines the level of access the endpoint device is allowed to the communication networks. As described herein, a top-tiered endpoint device may be designated as being part of a particular network slice using a high throughput, low-latency, high-bandwidth communication network such as a 5G mm-wave communication network.

The method 700 may continue with determining, at block 715, whether there is an available channel on a communication network. A communication channel may refer to, as described herein, a radio frequency channel that may form part of one of the a private LTE communication network, a public WiFi communication network, a private WiFi communication network, a 4G LTE public communication network, or a 5G millimeter-wave (mm-wave) communication network, among other types of public and private communication networks. Where a communication channel is available (YES determination at block 715), the process may continue with assigning a channel to the endpoint device at block 720. In an embodiment, the evolved packet core may include a look-up table that has a list of endpoint devices that have been and are communicatively coupled to a communication network. This look-up table may include endpoint device identification information that specifically identifies each endpoint device as it attempts to communicatively couple to a communication network. This identification information may be cross-referenced with an assigned tier as described in connection with block 710. The method 700 may include updating this look-up table when and if the endpoint device has never been communicatively coupled to the evolved packet core or a tier status associated with the endpoint device has changed. The method 700 may end here or may return to start for continued monitoring and central plane management among the plurality of endpoint devices and across the multiple wireless protocol network topologies within the sliced network by the private evolved packet core system.

Where no communication channel is available (NO determination at block 715), the method 700 may continue with determining whether the tier associated with the endpoint device is less than or equal to any of the endpoint devices communicatively coupled to any of the communication networks. Where it is determined that the tier associated with the endpoint device is less than or equal to any of the devices communicatively coupled to any of the communication networks (YES determination at block 730), the method may continue with denying connection of the endpoint device to any communication network at block 740 upon which the method 700 may end. Where it is determined that the tier associated with the endpoint device is higher than any of the devices communicatively coupled to any of the communication networks (NO determination at block 730), the method 700 may continue with dropping an endpoint device having the lowest or a lower tier from a communication network so that the new endpoint device may be communicatively coupled to the communication network. The method 700 may end here or may return to start for continued monitoring and central plane management among the plurality of endpoint devices and across the multiple wireless protocol network topologies within the sliced network by the private evolved packet core system.

Figure 8:
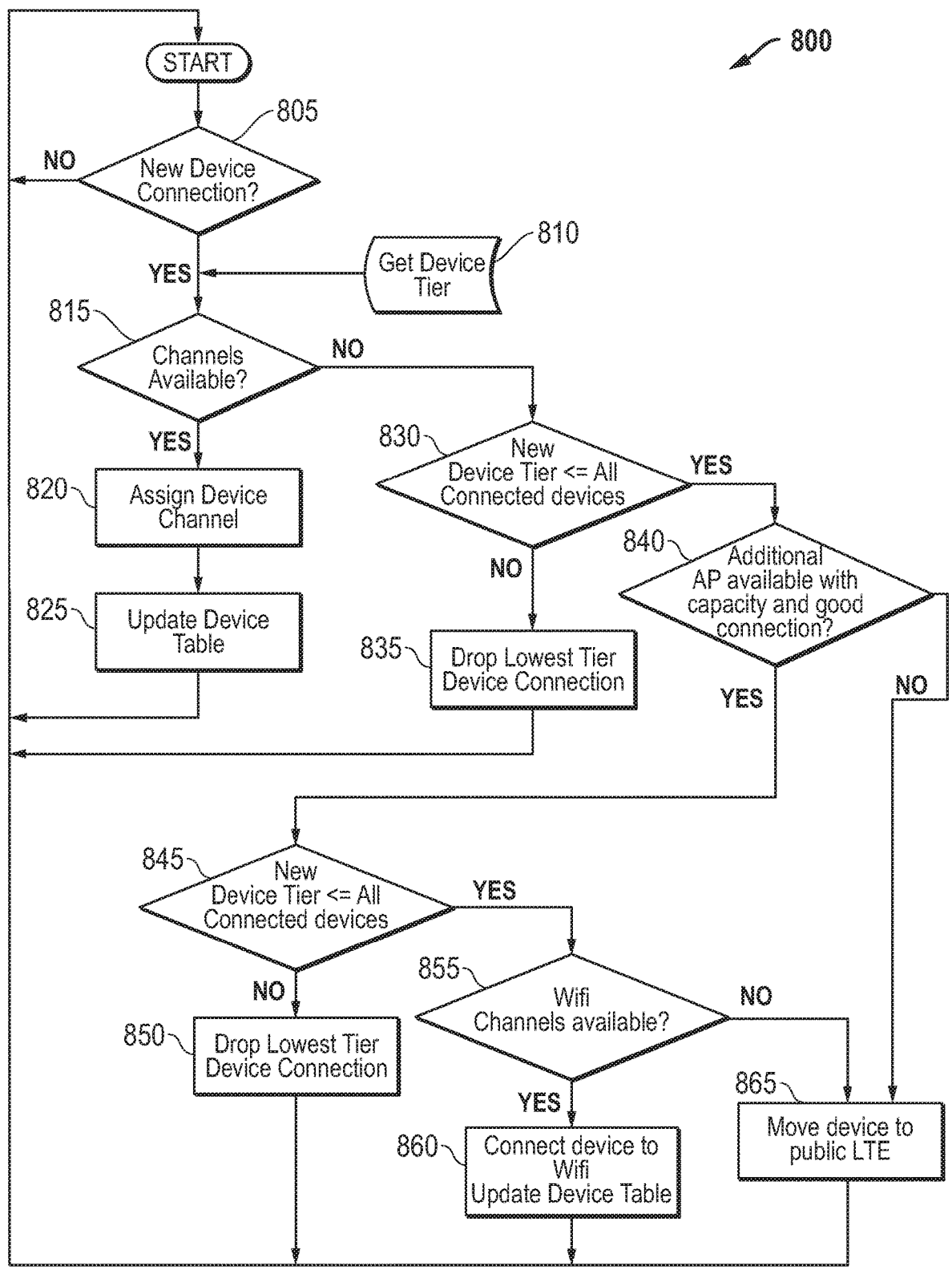
FIG. 8 is a flow diagram illustrating a method of managing data connections to a communication network with multiple wireless protocol network topologies according to an embodiment of the present disclosure.

FIG. 8 is a flow diagram illustrating a method 800 of managing data connections to a communication network via a private evolved packet core system operating central plane management across multiple wireless protocol network topologies within a sliced network according to another embodiment of the present disclosure. The method 800 may include, at block 805, with the detection of a new device at, for example, an evolved packet core associated with a communication network. As described herein, the evolved packet core may be any device or devices that execute instructions, parameter, and profiles so that voice and data communication requests from endpoint devices may be received and routed to a communication network as described herein. If no new device is detected, the method 800 may return to start for continued monitoring and central plane management among the plurality of endpoint devices and across the multiple wireless protocol network topologies within the sliced network by the private evolved packet core system for a new device or modified tiering assignment.

During this detection of the new device at block 805, the evolved packet core may receive or request data from the endpoint device at block 810. This data includes, at least, a designated tier that the endpoint device is assigned or information to identify a tier to be assigned from tier assignment parameters and definitions for the enterprise in a database of the private evolved packet core system. The tier defines the level of access the endpoint device is allowed to the communication networks. As described herein, a top-tiered endpoint device may be designated as being part of a particular network slice using a high throughput, low-latency, high-bandwidth communication network such as a 5G mm-wave communication network.

The method 800 may continue with determining, at block 815, whether there is an available channel on a communication network. A communication channel may refer to, as described herein, a radio frequency channel that may form part of one of the a private LTE communication network, a public WiFi communication network, a private WiFi communication network, a 4G LTE public communication network, or a 5G millimeter-wave (mm-wave) communication network, among other types of public and private communication networks. The private evolved packet core system operating central plane management may seek to provide access, where tier authorized, with a low latency or other signal quality threshold level, and adequate bandwidth level. In some embodiments, a wireless protocol access point with the lowest available latency or best bandwidth availability for an authorized tier designation may be selected. For a new, high-tier endpoint device or even a middle-tier endpoint device with authorization detected at block 805, access may be paired with a high bandwidth, low latency 5G mm-wave network if available in an example embodiment. Where a communication channel is available (YES determination at block 815), the process may continue with assigning a channel to the endpoint device at block 820. In an embodiment, the evolved packet core may include a look-up table that has a list of endpoint devices that have been and are communicatively coupled to a communication network. This look-up table may include endpoint device identification information that specifically identifies each endpoint device as it attempts to communicatively couple to a communication network. This identification information may be cross-referenced with an assigned tier as described in connection with block 810. The method 800 may include updating this look-up table when and if the endpoint device has never been communicatively coupled to the evolved packet core or a tier status associated with the endpoint device has changed. The method 800 may end here or may return to start for continued monitoring and central plane management among the plurality of endpoint devices and across the multiple wireless protocol network topologies within the sliced network by the private evolved packet core system.

If initially there is not communication channel available at the first-requested wireless protocol access point, the private evolved packet core system operating central plane management may conduct load balancing based on proximity and occupancy of multiple wireless access points for a particular wireless protocol in some embodiments as part of the operations of the private evolved packet core system operating central plane management at block 815. In another example embodiment, the private evolved packet core system may determine if one or more endpoint devices on a network may have access to a better or different wireless network access point experiencing low traffic volumes or with availability (e.g., in CBRS bandwidth with no reporting higher priority users).

Where no communication channel is still available (NO determination at block 815) after load balancing, the method 800 may continue to block 830 with determining whether the tier associated with the endpoint device is less than or equal to any of the endpoint devices communicatively coupled to the communication network. Where it is determined that the tier associated with the endpoint device is higher than any of the devices communicatively coupled to any of the communication networks (NO determination at block 830), the method 800 may continue with dropping an endpoint device having the lowest or a lower tier from a communication network so that the new endpoint device may be communicatively coupled to the communication network at block 835. The method 800 may end here or may return to start for continued monitoring and central plane management among the plurality of endpoint devices and across the multiple wireless protocol network topologies within the sliced network by the private evolved packet core system.

Where it is determined that the tier associated with the endpoint device is less than or equal to any of the devices communicatively coupled to any of the communication networks (YES determination at block 830), the method 800 may continue with determining whether an additional access point is available with capacity and that has a good connection such as a good signal strength. Where it is determined that no additional access point is available with capacity and that has a good connection such as a good signal strength (NO determination at block 840), the method 800 may continue with moving the endpoint device to a public LTE communication network at block 865 thereby allowing the endpoint device to rely on resources that are not part of the private network or require a subscription for services.

Where it is determined that an additional access point is available with capacity and that has a good connection such as a good signal strength (YES determination at block 840), the method 800 may continue with determining whether a channel is available or whether the tier associated with the endpoint device is less than or equal to any of the endpoint devices communicatively coupled to the communication network to make a channel available. For a new endpoint device, depending in some cases on tier designation, access may be paired with a next available high bandwidth, low latency wireless protocol such as eNodeB connections via a private LTE on a CBRS band or other available private LTE band in an example embodiment. In some embodiments, the private evolved packet core system may conduct load balancing among the next level wireless protocol to assess whether a channel is available on such a protocol among access points or may conduct load balancing among a plurality of protocols in case other endpoint devices may be moved between protocols such as up to a 5G NR access point with capacity. Where it is determined that the tier associated with the endpoint device is higher than any of the devices communicatively coupled to any of the communication networks (NO determination at block 845), the method 800 may continue with dropping an endpoint device having the lowest or a lower tier from a communication network so that the new endpoint device may be communicatively coupled to the communication network at block 850. The method 800 may end here or may return to start for continued monitoring and central plane management among the plurality of endpoint devices and across the multiple wireless protocol network topologies within the sliced network by the private evolved packet core system.

Where it is determined that the tier associated with the endpoint device is less than or equal to any of the devices communicatively coupled to the third level communication network or networks (YES determination at block 845), the method 800 may continue with determining whether a private WiFi channel is available on the communication network at block 855. Where a private WiFi channel is available (YES determination at block 855), the endpoint device may be communicatively coupled to the private WiFi communication network and the look-up table may be updated at block 860. Again, load balancing may be conducted on the private Wi-Fi wireless network system to further determine availability of a channel. The method 800 may end here or may return to start for continued monitoring and central plane management among the plurality of endpoint devices and across the multiple wireless protocol network topologies within the sliced network by the private evolved packet core system.

Where it is determined that the tier associated with the endpoint device is not less than or equal to any of the devices communicatively coupled to the currently assessed internal Wi-Fi communication network (NO determination at block 845), the method 800 may continue with moving the endpoint device to a public LTE communication network at block 865 thereby allowing the endpoint device to rely on resources that are not part of the private network or that require a subscription for services. The method 800 may end here with the communication between the endpoint device and the public LTE being maintained until the method 800 begins again with the endpoint device attempting a new connection with the communication network.

The blocks of the flow diagrams of FIGS. 7 and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
   a processor;
   a memory;
   the processor executing instructions of a portion of an evolved packet core to initiate a tiered communication network access policy by:

detecting the connection of an endpoint device to the communication network via one of a plurality of access points;

receiving data descriptive of a tier assigned, from a plurality of available tiers assigned for endpoint devices, to the endpoint device; and determining if a communication channel is available on the communication network for the endpoint device to use; and the processor executing instructions of a load balancing module to:

based on the tier assigned to the endpoint device, determine which communication channel among a plurality of communication channels to allow the endpoint device to access the communication network with; and determine which, among the plurality of access points within the network to facilitate the endpoint device to communicatively coupled to the communication network; and reallocate endpoint device access to the one of the plurality of access points based on:
  a number of endpoint devices communicatively coupled to the communication network via any of the access points of the plurality of access points;
  the tier from the plurality of tiers assigned to each of the endpoint devices; and
  network data slice requirements for each endpoint device.

2. The information handling system of claim 1, wherein, when the evolved packet core determines that a communication channel is available, the evolved packet core assigns the endpoint device to a communication channel and updates a look-up table maintained on the memory that contains data identifying the endpoint device and its associated assigned tier.

3. The information handling system of claim 1, wherein the load balancing module, subsequent to conducting a load balancing process, further determines whether a communication channel is available for the endpoint device to communicatively couple to and, where there is no communication channel to couple to, the load balancing module determines whether the tier of the endpoint device is less than or equal to any connected endpoint devices.

4. The information handling system of claim 3, wherein, when the load balancing module determines that the tier of the endpoint device is not less than or equal to any connected endpoint devices, the load balancing module drops from the communication network a lower-tiered connected endpoint device.

5. The information handling system of claim 3, wherein, when the load balancing module determines that the tier of the endpoint device is less than or equal to any connected endpoint device, the load balancing module determines whether another access point is available for the endpoint device to be communicatively coupled to.

6. The information handling system of claim 1, wherein the plurality of communication channels comprises a 5G mm wave communication channel, a public 4G long term evolution (LTE) communication channel, a private 4G LTE communication channel, a citizens broadband radio service (CBRS) communication channel, a private WiFi communication channel, and a public WiFi communication channel.

7. The information handling system of claim 1, wherein the slice requirements for each endpoint device includes communication network low latency requirements, access point proximity requirements, communication network bandwidth requirements, and communication network security requirements.

8. The information handling system of claim 1, wherein the load balancing module, subsequent to conducting a load balancing process, further determines:

whether a communication channel is available for the endpoint device to communicatively couple to;

where there is no communication channel to couple to, the load balancing module determines whether the tier of the endpoint device is less than or equal to any connected endpoint devices;

when the load balancing module determines that the tier of the endpoint device is less than or equal to any connected endpoint device, the load balancing module determines whether another access point is available for the endpoint device to be communicatively coupled to; and where there is no additional access point available for the endpoint device to be communicatively coupled to, the load balancing module determines whether a private WiFi channel is available for the endpoint device to connect to.

9. The information handling system of claim 8, wherein, when the load balancing module determines that a private WiFi channel is not available for the endpoint device to connect to, the load balancing module communicatively couples the endpoint device to a public LTE channel.

10. A method of managing data connections to a communication network; comprising:

initiating a tiered communication network access policy by:

detecting the connection of one of a plurality of endpoint devices to the communication network via one of a plurality of access points;

receiving data descriptive of a tier, from a plurality of available tiers assigned for endpoint devices, assigned to the endpoint device, from a plurality of available tiers assigned for endpoint devices;

determining if a communication channel is available on the communication network for the endpoint device to use;

based on the tier assigned to the endpoint device, determining which communication channel among a plurality of communication channels to allow the endpoint to access the communication network with; and determining which, among the plurality of access points within the network to facilitate the endpoint device to communicatively coupled to the communication network; and reallocating endpoint access to the one of the plurality of access points based on:
  a number of endpoint devices communicatively coupled to the communication network via any of the access points of the plurality of access points;
  the tier from the plurality of tiers assigned to each of the endpoint devices; and
  data slice requirements for each endpoint device.

11. The method of claim 10, further comprising assigning the endpoint device to a communication channel and updating a look-up table that contains data identifying the endpoint device and its associated assigned tier when it is determined that a communication channel is available.

12. The method of claim 10, further comprising determining whether a communication channel is available for the endpoint device to communicatively couple to subsequent to conducting a load balancing process and, where there is no communication channel to couple to, determining whether the tier of the endpoint device is less than or equal to any connected endpoint devices.

13. The method of claim 12, further comprising dropping from the communication network a lower-tiered connected endpoint device when it is determined that the tier of the endpoint device is not less than or equal to any connected endpoint devices.

14. The method of claim 12, further comprising determining whether another access point is available for the endpoint device to be communicatively coupled to when it is determined that the tier of the endpoint device is less than or equal to any connected endpoint device.

15. The method of claim 10, further comprising, subsequent to conducting a load balancing process:
   determining whether a communication channel is available for the endpoint device to communicatively couple to; and
   determining whether the tier of the endpoint device is less than or equal to any connected endpoint devices where there is no communication channel to couple to;
   determining whether another access point is available for the endpoint device to be communicatively coupled to when it is determined that the tier of the endpoint device is less than or equal to any connected endpoint device; and
   determining whether a private WiFi channel is available for the endpoint device to connect to when it is determined that there is no additional access point available for the endpoint device to be communicatively coupled to.

16. The method of claim 15, further comprising communicatively coupling the endpoint device to a public LTE channel when it is determined that a private WiFi channel is not available for the endpoint device to connect to.

17. An information handling system, comprising:
   a processor;
   a memory;
   the processor executing instructions of a portion of an evolved packet core to initiate a tiered communication network access policy by:
      detecting the connection of a plurality of endpoint devices to the communication network via a plurality of access points;
      receiving data descriptive of a tier assigned to each of the endpoint devices, from a plurality of available tiers assigned for endpoint devices; and
      determining if a communication channel is available on the communication network for each of the endpoint devices to use;
   the processor executing instructions of a portion of a network data slicing module to form a plurality of virtualized logical networks associated with the evolved packet core; and
   the processor executing instructions of a portion of a load balancing module to:
      based on the tier of the plurality of tiers assigned to each of the plurality of endpoint devices and the virtualized logical network that each of the plurality of endpoint devices is coupled to, determine which communication channel among a plurality of communication channels to allow the endpoint devices to access the communication network with; and
      determine which, among the plurality of access points within the network to facilitate the endpoint devices to communicatively coupled to the communication network; and
      reallocate endpoint device access to the one of the plurality of access points based on:
         a number of endpoint devices communicatively coupled to the communication network via any of the access points of the plurality of access points;
         the tier of the plurality of tiers assigned to each of the endpoint devices; and
         virtualized logical network requirements for each of the plurality of endpoint devices.

18. The information handling system of claim 17, wherein, when the evolved packet core determines that a communication channel is available, the evolved packet core assigns the endpoint device to a communication channel and updates a look-up table maintained on the memory that contains data identifying the endpoint device and its associated assigned tier.

19. The information handling system of claim 17, wherein the load balancing module, subsequent to conducting a load balancing process, further determines whether a communication channel is available for the endpoint device to communicatively couple to and, where there is no communication channel to couple to, the load balancing module determines whether the tier of the endpoint device is less than or equal to any connected endpoint devices.

20. The information handling system of claim 17, wherein the load balancing module cycles through each connection to the evolved packet core by each of the plurality of endpoint devices and reallocates those connections in order to optimize a data throughput, a connection reliability, and a data bandwidth, for each of the plurality of endpoint devices.

* * * * *